(12) United States Patent
Young

(10) Patent No.: US 7,830,832 B2
(45) Date of Patent: Nov. 9, 2010

(54) DISTRIBUTED VOTING SYSTEM AND METHOD FOR LAND MOBILE RADIO SYSTEM

(75) Inventor: Stewart Young, Bedford, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 1574 days.

(21) Appl. No.: 10/828,019

(22) Filed: Apr. 20, 2004

(65) Prior Publication Data

US 2005/0232295 A1     Oct. 20, 2005

(51) Int. Cl.
*H04J 3/16*      (2006.01)
*H04L 12/28*    (2006.01)
*H04W 4/00*    (2009.01)

(52) U.S. Cl. .................... 370/329; 370/431; 370/437

(58) Field of Classification Search ................ 370/329, 370/341, 431, 437, 331, 332, 333
See application file for complete search history.

(56) References Cited

U.S. PATENT DOCUMENTS

| | | | |
|---|---|---|---|
| 5,113,413 A * | 5/1992 | Brown et al. ................ | 375/267 |
| 5,131,007 A * | 7/1992 | Brown et al. ................ | 375/267 |
| 5,719,871 A | 2/1998 | Helm et al. | |
| 5,898,931 A * | 4/1999 | I'Anson et al. ............. | 455/560 |
| 6,556,834 B1 * | 4/2003 | Kobayashi et al. .......... | 455/464 |

FOREIGN PATENT DOCUMENTS

WO    WO 00/70782    11/2000

OTHER PUBLICATIONS

European Search Report, Application No. EP 05 10 3116, Date of Application, Nov. 2, 2007.

* cited by examiner

*Primary Examiner*—Chirag G Shah
*Assistant Examiner*—Srinivasa R Reddivalam
(74) *Attorney, Agent, or Firm*—Fox Rothschild, LLP; Robert J. Sacco

(57) ABSTRACT

A distributed Internet Protocol (IP) voting system and method for use in Land Mobile Radio (LMR) Systems having a central send-and-receive site and one or more receive-only sites. In the distributed voting system, receive-only sites are directly linked to the control point using a network and associated packet transmission protocol. This may be a high-speed asynchronous data link such as a standard IP network link. Each remote site receiving digital data, calculates a bit error for that data. This error calculation is incorporated into the data header information. The data header information and data are placed in an IP packet and transmitted as a User Data Protocol (UDP) message to the control point. The control point selects the lowest bit rate data message, or the first control message, and retransmits it using a standard radio air interface protocol, such as the APCO Project 25 air interface protocol.

20 Claims, 4 Drawing Sheets

DISTRIBUTED VOTING SYSTEM AND METHOD FOR LAND MOBILE RADIO SYSTEM

FIELD OF THE INVENTION

The present invention relates generally to the field of radio systems and more particularly to radio systems that select the most usable communications signal produced by one of a plurality of receivers.

BACKGROUND OF THE INVENTION

Modern Land Mobile Radio (LMR) communications systems typically have a number of geographically distributed receive-only sites associated with each receive-and-transmit site in the system. The need for these receive-only sites can be understood by considering a simple LMR system having a single receive-and-transmit site. The transmitter of this single receive-and-transmit site is designed to service a desired geographical area by an appropriate choice of the factors that contribute to its Effective Radiated Power (ERP). For instance, the receive-and-transmit site is typically located at a relatively high elevation, such as on the top of a hill, mountain or tall building, and has a relatively high-powered Radio Frequency (RF) transmitter so that all the LMR transceivers operating within the desired service area can revive the signals it transmits at an acceptable strength.

However, the mobile and portable RF transceivers served by the receive-and-transmit site typically have considerably smaller ERPs because of power, size and cost considerations. For instance, the receive-and-transmit site typically has access to grid or generator power and can produce RF transmission signals of several hundred watts, whereas a mobile transceiver operating on its own batteries, or via a vehicle's electrical system, is typically capable of generating an RF transmission signal of only 5 to 25 watts. A portable or hand-held transceiver, having a few small nickel-cadmium battery cells as its power source, is even more restricted and may generate an RF transmission signal of only 1 watt or less. The result is that while all the LMR mobile/portable transceivers within the service area can typically receive the strong transmissions from the receive-and-transmit site, the receive-and-transmit site may not receive the weaker transmissions from the mobile and portable transceivers or may receive the transmissions at signal strengths that are too low to provide useful, reliable communications. In other words, the "talk in" or "talkback" range of the receive-and-transmit site is typically significantly less than its "talk out" range.

Having multiple receive-only sites at various geographical locations throughout the LMR service area can solve this problem as long as at least one of the receive-only sites, or the receive-and-transmit site, receives any particular transmission at an acceptable signal strength level. Once a receiver somewhere within the LMR system receives one acceptable version of a transmitted signal, that version of the signal can be relayed back to the receive-and-transmit site by landline and re-transmitted by the main site at a sufficiently high power level that all transceivers in the service area are able to receive the relayed signal an acceptable signal strength level. However, depending upon where the transmitting transceiver is when it transmits the original signal, more than one the receive-only sites will typically receive the original transmission at an acceptable signal strength level. The LMR system therefore needs to select one version of the received transmission signals, preferably the best one, and to ignore the rest. In existing system this selection is accomplished by a process referred to as "voting, which requires specialized voting equipment (also referred to as the "voter" or "the selector"). Typically the voter is connected to each of the receiving sites by landlines. Sites that receive the transmission relay the signal to the voter via these landlines. The voter then analyzes each received signal in turn and determines which one is the best. This determination is based on, for instance, the signal-to-noise ratio of the signal or a bit error rate in a standard part of the signal, such as a frame header. Once the voter has selected the best signal, and determined which receiver sent it, the voter proceeds to relay signals from that receiver to the receive-and-transmit site by landline for transmission. Such voting systems have been described in detail in, for instance, U.S. Pat. No. 4,013,962 titled "Improved Receiver Selecting (Voting) System" issued to Beske et al. on Mar. 22, 1977 and U.S. Pat. No. 5,131,007 titled "Digital Voter for Multiple Site PSTR Trunking System" issued to Brown et al. on Jul. 14, 1992, the contents of both of which are hereby incorporated by reference.

The voting systems described above use special voting equipment. They also introduce significant delays (also known as latency) into the transmission due to buffering required to ensure that the transmitter does not under run, i.e. does not begin transmission before all the necessary data has been received, and to ensure that all receiving sites have sufficient time to get their data to the voter. Existing digital voting systems also require a synchronized data interface between the RF receiving sites and the voting equipment. This synchronization allows the voter to poll the receiving sites serially. Synchronization also allows the voter selected receiving site to transmit its received signal by landline to the voter in a specific time window. This received signal is temporarily stored, or buffered, at the voter before being relayed on to the receive-and-transmit site for retransmission.

The problems associated with this approach to digital voting include the significant investment in voting equipment, the need for synchronized data paths, the latency introduced into the transmission by the buffering during transfer of the synchronous data and the need for the voter to poll all receivers serially.

SUMMARY OF THE INVENTION

The present invention relates to a distributed Internet Protocol (IP) voting system and method for a Land Mobile Radio (LMR) system that overcomes the drawbacks of existing digital voting systems by doing away with the need for specialized voting equipment and synchronized data paths. In addition the present invention significantly reduces the latency introduced by the transfer and buffering of synchronous data and by the voter polling.

In a preferred embodiment of the invention, each receiver in the LMR system that receives a transceiver transmission signal at a usable strength estimates the quality of the received transmission signal. The receiver combines its estimation of quality and the received transmission signal into a packet which is sent over a network to the LMR's receive-and-transmit site. At the receive-and-transmit site, incoming packets are separated back into the estimation of quality and the signal. The signal associated with the first packet to arrive is stored in a local buffer. The receive-and-transmit site continues to receive additional incoming packets for a predetermined length of time or acceptance window, chosen to be long enough for packets to arrive from all receiving sites within the LMR system. This acceptance window allows asynchronous transmission of packets from the receivers to the receive-and-transmit site and its associated routing and processing equipment. If a latter packet has a better estimation of quality, the currently stored signal is replaced with the signal from the latter packet. At the end of the acceptance window, the receive-and-transmit site transmits the signal currently stored in its buffer.

The IP facilitated, asynchronous voting method of this invention ensures that the best received signal is used for re-transmission by the LMR system, while significantly decreasing system latency by limiting the time taken for voting to the length of the acceptance window. This acceptance window is typically significantly less than the time taken for polling all receivers in existing voting equipment. Additionally, because the messages are sent directly from a remote receiver to the receive-and-transmit site, both the additional transit time and a message store-and-repeat cycle are eliminated. A further advantage is that system costs are also reduced by eliminating specialized voting equipment and by removing the constraint of having all receiving sites synchronized.

Further details and advantages of the current invention are illustrated in the drawings of this specification and in the detailed description below.

DETAILED DESCRIPTION

The present invention relates to an improved voting method and apparatus for use in Land Mobile Radio (LMR) systems that will now described in more detail.

In the preferred embodiment of the present invention, each main transmitting site in the LMR system includes a receive-and-transmit site and associated receivers, transmitters and processing equipment. Each main transmitting site is also associated with one or more remote receiving sites, each of which includes a receive-only site and associated receivers and processing equipment. Communication between the main transmitting site and the remote sites includes an Internet Protocol (IP) enabled network. Each receiver in the LMR system that receives a transceiver transmission signal at a usable strength estimates the quality of the received transmission signal. The receiver combines its estimation of quality and the received transmission signal into a packet which is sent over a network to the main transmitting site associated with that receiver. As soon as the first packet or data unit is received at the main site, the voting process begins and continues for a short time referred to as a timing window. This timing window allows asynchronous transmission of the packets from the receivers back to the main site. This asynchronous transmission is necessary to allow data units that have experienced different Radio Frequency (RF) propagation times, and/or Internet (IP) Wide Area Network (WAN) transfer times, to arrive. The voting process begins with the main site recording the pre-calculated bit error rate of the first data unit or message packet to arrive. After this, the main unit begins storing the data unit or message packet contents. If and when further data unit arrive, the main site compares their bit error rate with that of the data packet already in the process of being stored.

In one embodiment of the invention, as soon as a packet with a lower bit error rate arrives, the main transmitting site switches to recording the new packet, overwriting any previously recorded packet. At the end of the timing or acceptance window, the packet that has been stored by the main site is re-transmitted.

In one embodiment of the invention, there may be some hysteresis in the voting, i.e. a previously selected receiving site is automatically used for the following data packet unless a data packet with significantly better bit error rate arrives. This hysteresis in the voting allows for some amount of continuity in remote site selection.

An exemplary embodiment incorporating the inventive concepts of the invention will now be described by reference to the attached drawings. During the course of this description like numbers will be used to identify like elements according to the different views that illustrate the invention.

Figure 1:
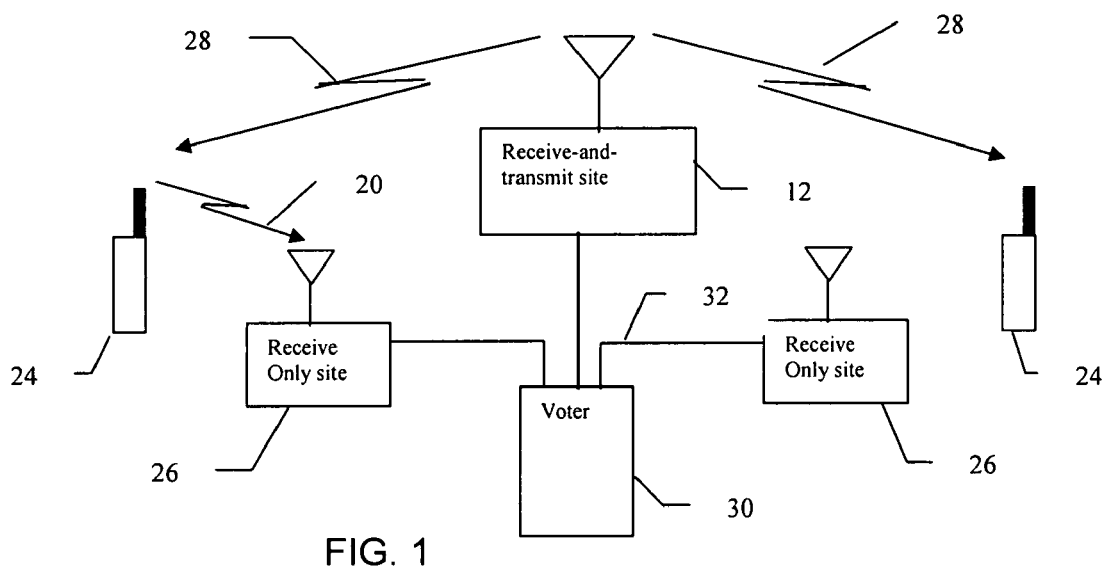
FIG. 1 is a schematic representation of a representative, voting system using a voter.

FIG. 1 is a schematic representation of a representative, voting system using a voter, comprising a receive-and-transmit site 12, multiple receive-only sites 26, multiple mobile or portable transceivers 24 and a voter 30. The receive-and-transmit site 12 is has an Effective Radiated Power (ERP) that is significantly larger than the ERP of the mobile or portable transceivers 24. When a first transceiver 24 transmits a signal 20, that signal may not be received at an acceptable signal-strength by all other transceivers 24 operating in the LMR system's operational area or by the receive-and-transmit site 12. However, the multiple receive-only sites 26 are typically geographically distributed throughout the areas of operation so that no matter where transceiver 24 is when it transmits signal 20, one or more of the receive-only sites 26 will receive signal 20 at an acceptable signal-strength. Each of the receive-only sites 26 that receives signal 20 at an acceptable signal-strength relays the signal 20 to a voter 30 via landlines 32. The voter 30 analyses each of the singles 20 it receives, determines a best signal and relays that signal on to the receive-and-transmit site 12 by landline. Receive-and-transmit site 12 re-transmits signal 20 using its more powerful transmitter as the more powerful signal 28 which can then be received by all other transceivers 24 operating in the LMR system's area of operation.

Receive-and-transmit site 12 is typically situated in an advantageous location, such as on top of a hill, a mountain or a large building and includes a relatively high-powered RF transmitter, typically operating off grid or generator power and producing RF output in the range of several hundreds of watts. Receive-and-transmit site 12 may comprise a system such as, but not limited to, a MASTR® III Base Station operating at 800 MHz and rated as being capable of generation an RF power transmission signal of 100 Watts, as produced by M/A Corn Wireless Systems, Lynchburg, Va., USA. Transceiver 24 may be a mobile transceiver operating off its own batteries or a vehicle electrical system such as, but not limited to, MIA Corn Wireless Systems' Orion™ Mobile, 800 MHz transceiver, which is rated as being capable of generating an RF power transmission signal of only about 8 to 35 watts. Transceiver 24 may also be a portable or hand-held transceiver, such as but not limited to, M/A Corn Wireless Systems' P7100$^{IP}$, 800 MHz transceiver, operating off small batteries such as, but not limited to, small nickel-cadmium battery cells, and may generate an RF transmission signal of only 1-3 Watts or less. Receive-only site may comprise equipment such as, but not limited to, M/A Corn Wireless Systems' MASTR® III Auxiliary Receiver operating at 800 MHz and designed for use in a voted system having a voter 30. Voter 30 may comprise equipment such as, but not limited to, M/A Com Wireless Systems' Aegis™ Digital Voting System, designed to be capable of voting up to 12 receivers. The landlines may be suitable telecommunications lines such as, but not limited to, well-known T1 lines.

Figure 2:
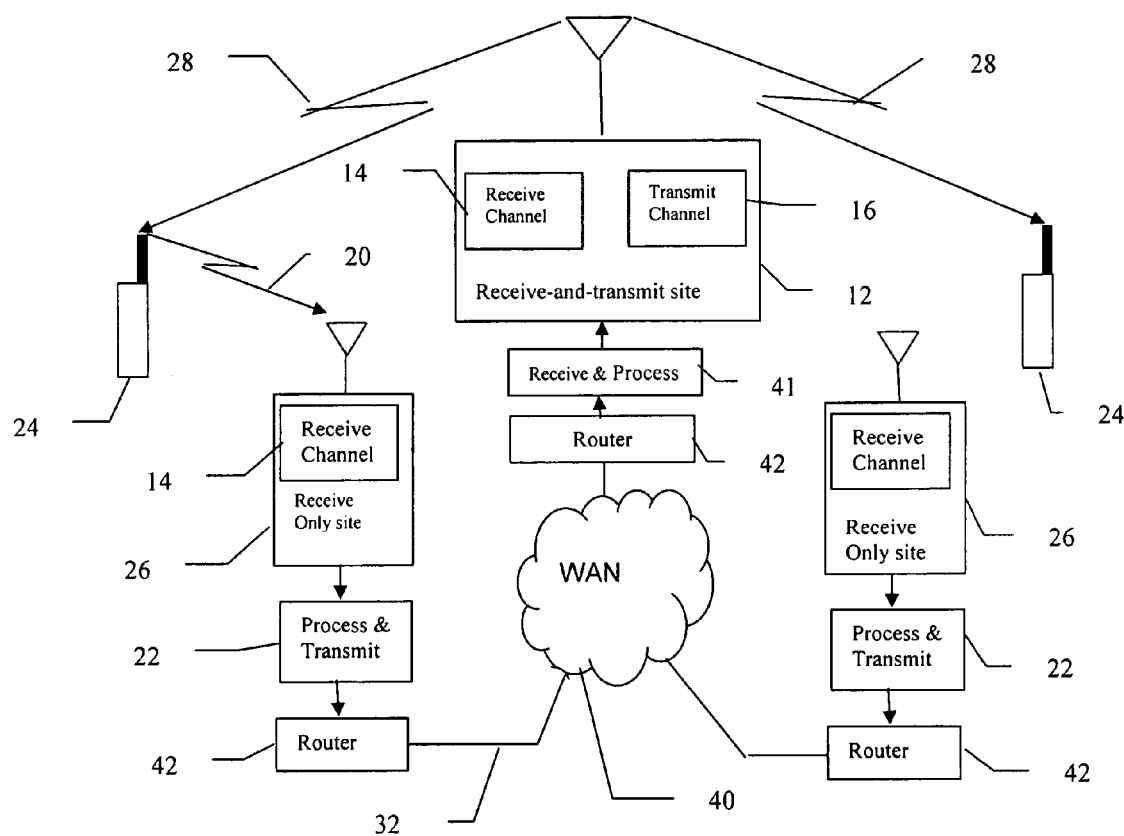
FIG. 2 is a schematic overview of a distributed voting architecture in accordance with the inventive concepts of the present invention.

FIG. 2. shows is a schematic overview of a distributed voting architecture in accordance with the inventive concepts of the present invention comprising a receive-and-transmit site 12 having one or more receive channels 14 and one or more transmit channels 16, a receive-and-transmit site receive-and-process unit 41, routers 42, one or more receive-only-sites 26 each having one or more receive channels 14, a process and transmit unit 22, and router 42; landlines 32, network 40 and transceivers 24. In the distributed voter system incorporating the inventive concepts of the present invention, the voter 30 is effectively replaced by the process-and-transmit units 22, the routers 42, the network 40 and the receive-and-process unit 41. As in the scenario described in discussing FIG. 1 above, when a first transceiver 24 transmits a signal 20, that signal may not be received at an acceptable signal-strength by all other transceivers 24 operating in the LMR system's operational area or by the receive-and-transmit site. However, one or more of the geographically distributed receive-only sites 26 receives the signal 20 at an acceptable signal-strength on an appropriate receiving channel 14. In the system of the present invention, the process-and-transmit unit 26 associated with each receive-only site 26 determines how good a received signal it has received, i.e. the process-and-transmit unit 26 calculates a quality measure of the received signal 20. The process-and-transmit unit 26 may include a receiver processor such as, but not limited to, any suitable, well-known digital processing chip or card and associated circuitry such as, but not limited to, well-known memory circuits and modems, and any associated software required to provide the desired functionality.

In the preferred embodiment, the LMR system uses an air interface protocol such as, but not limited to, the well-known Association of Public Safety Communications Officials (APCO) Project 25 air interface. The air interface protocol includes specifications for voice and data transmission data units, including specifications for header data units, terminator data units and packet data units and various standard data patterns associated with these data units, including, but not limited to, synchronization bit patterns and frame header bit patterns. The quality measure determined by the process-and-transmit unit 26, or the receiver processor therein, may comprise, but is not limited to, a bit error rate of a synchronization bit pattern, a frame header bit pattern or other standard, pre-defined part of the received signal 20. The process-and-transmit unit 26 packages the signal and the quality measure as a transfer signal into a packet which is sent by the router 42 over landlines 32, and via the network 40, to the receive-and-transmit site's receive and process unit 41.

In a preferred embodiment the packet, and the router 42 used to send it over the network 40, both conform to the well-known Internet Protocol (IP). In the preferred embodiment the packet is in the well-known IP User Datagram Protocol (UDP) format. In the preferred embodiment the landlines 32 used as connections to the network are well-known T1 lines. Network 40 may be any suitable communications network such as, but not limited to, the public Internet or some high-speed, an asynchronous data network. If greater security is required, network 40 may be any suitable securely encrypted, private WAN, encrypted using well-known encryption techniques and procedures.

When the transfer signal arrives at the receive-and-process unit 41 associated with the receive-and-transmit unit 12, the quality measure is extracted from the packet. The receive-and-transmit unit 12 may include a transmitter processor such as, but not limited to, any suitable, well-known digital processing chip or card and associated circuitry such as, but not limited to, well-known memory circuits and modems, and any associated software required to provide the desired functionality. If the quality measure indicates that the received signal contained in the packet is better than the received signal currently stored in the receive-and-process unit 41's next-to-transmit buffer, the existing, stored received signal is replaced with the new received signal. At the end of a predetermined time window, the receive-and-process unit 41 transfers the received signal currently stored in its next to transmit buffer to the appropriate transmission channel 16 for re-transmission. The time window is chosen to be long enough to allow transfer signal packets to arrive from all the associated receive-only sites 26, by all reasonable paths. The received signal, originally transmitted by one transceiver operating in the LMR area of operation, is now re-transmitted using the more powerful transmission capability of the receive-and-transmit site 12's transmitters, so that the retransmitted signal 28 can be received at an acceptable signal strength by all transceivers 24 in the LMR area of operation.

Figure 3:
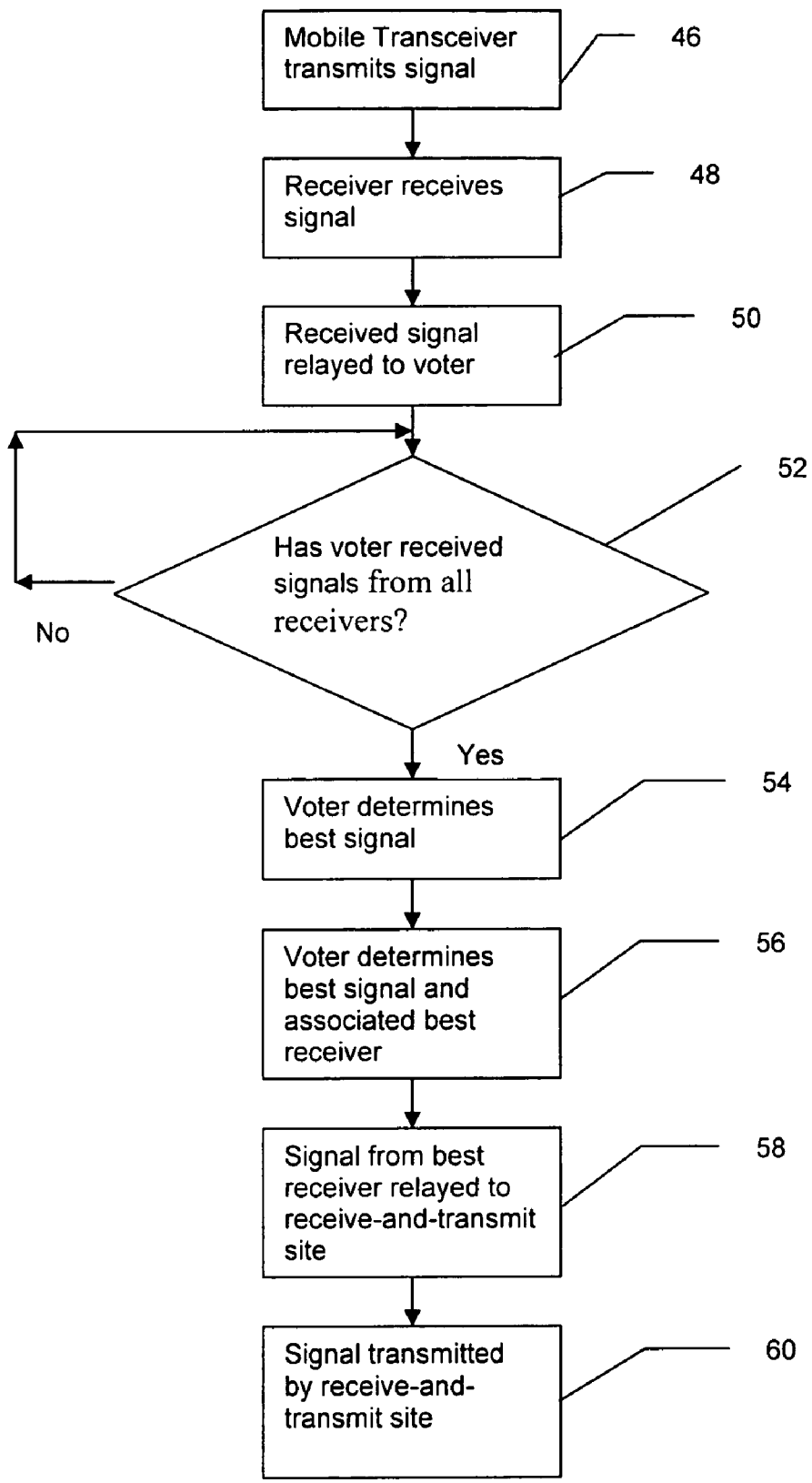
FIG. 3 is a flow diagram showing the operation of a voting architecture using a voter.

FIG. 3 is a flow diagram showing the operation of a voting architecture using a voter. In step 46, a transceiver within the LMR system's area of operation, begins transmitting a signal. In step 48, a receiver within the LMR system receives the transmitted signal on an appropriate receiving channel. This received signal is then transferred or relayed to a voter in step 50. Transfer of the received signal to the voter is typically done over a landline such as, but not limited to, a well-know T1 line. In step 52 the voter polls all associated receivers, which typically include one receive-and-transmit site and one or more receive-only sites. When the voter has finished polling, and has received signals from all receivers that received the signal transmitted by the transceiver, the voter moves on to step 54 of determining which receiver obtained the best signal. The determination of step 54 may be done by considering, for instance, the signal strength, the signal-to-noise ratio of each signal or the bit error rate of the signal or a portion of the signal.

Once the voter has determined the best signal and which is the associated best receiver, the voter proceeds to step 58 in which the received signal from the best receiver is relayed to the receive-and-transmit site 12. In step 60, the receive-and-transmit site re-transmits the received signal using at a signal strength that now allow the transmission to be received at an acceptable signal strength by all transceivers in the LMR system's area of operation. The step 58 of relaying the received signal from a receive-only site to the receive-and-transmit site typically involves buffering of the received signal in order to ensue that the transmitter does not under-run, i.e. that the transmitter does not begin transmitting before the entire signal has been received. This buffering introduces a significant delay (also known as latency) into the LMR system.

Figure 4:
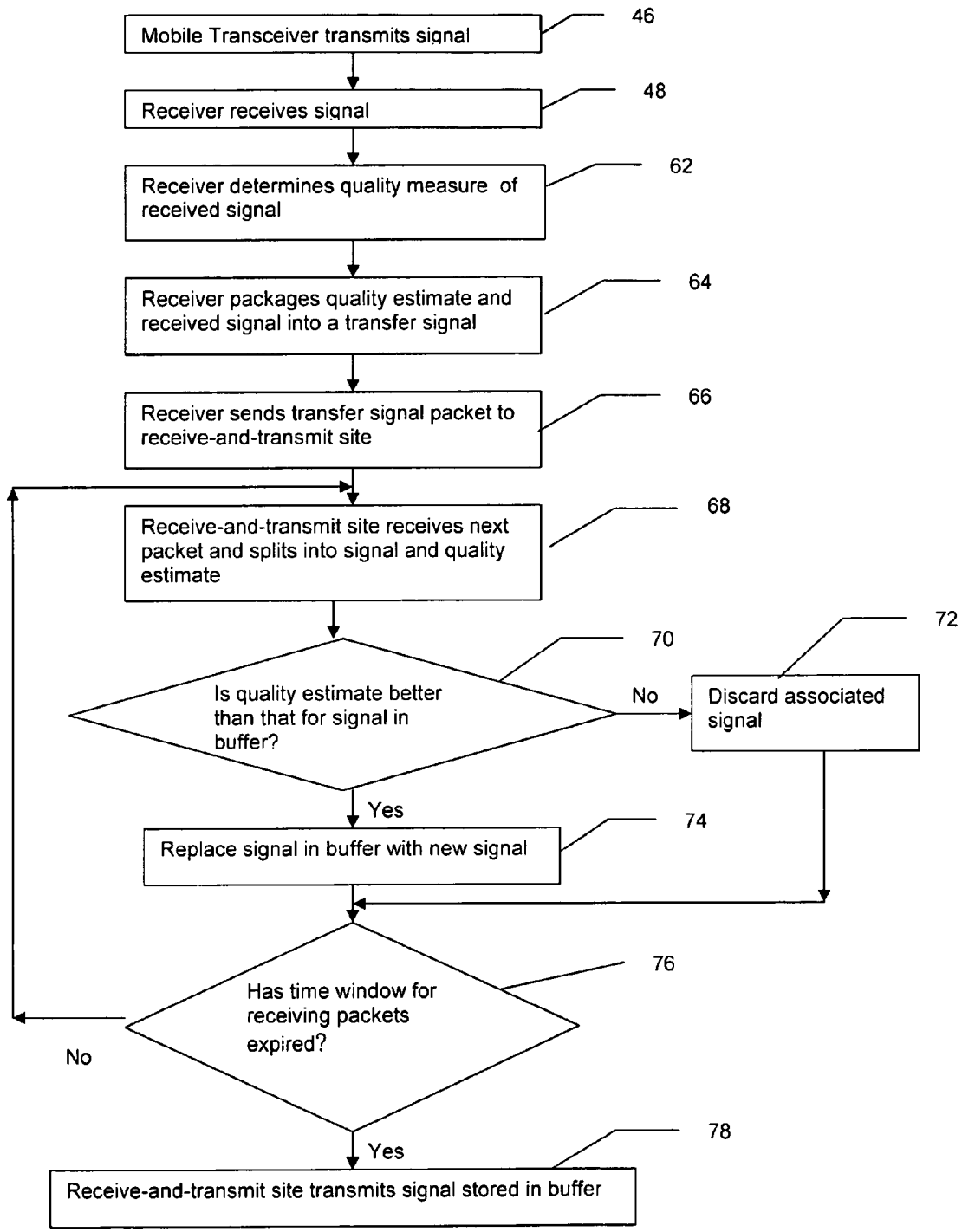
FIG. 4 is flow diagram showing the operation of a distributed voting architecture in accordance with the present invention.

FIG. 4 is flow diagram showing the operation of a distributed voting architecture in accordance with the present invention. In step 46, a mobile or portable transceiver in the LMR system's area of operation transmits a signal. In step 48, the signal is received by one or more receivers in the LMR system. A receiver processor associated with each of the receivers that acquires a received signal then determines a quality measure of that received signal. In the preferred embodiment the quality measure is a bit error rate of a synchronization bit pattern, of a frame header bit pattern or of some other standard, pre-defined part of the received signal. In step 64, the receiver packages the received signal and the quality measure into a transfer signal. In the preferred embodiment this transfer signal takes the form of a well-known UDP data gram or packet. In step 66 the receiver sends the transfer signal to the receive-and-transmit site via a suitable communications network and associated equipment such as, but not limited to appropriate routers, landlines, network connections and network links. In the preferred embodiment, the network connections include well-known T1 lines and the communications network may be a network such as, but not limited to, the public Internet or an appropriately secured WAN.

When the receive-and-transmit site receives the first packet that is a transfer signal, an associated transmitter processor unpacks the transfer signal and accesses the received signal and the quality measure. The received signal is stored in a next-to-transmit buffer and the quality measure is stored in a suitable processor memory. When a next packet containing a transfer signal is received, the quality measure in that packet is accessed. If the quality measure of the latest transfer signal indicates a better received signal than that already stored in the next-to-transmit buffer, the new received signal replaces the existing received signal in step 74. If the new received signal is not better, it is discarded in step 74. In step 76, the transmitter processor checks if a predetermined time window has elapsed since receiving the first transfer signal. If the time window has elapsed or expired, the signal currently stored in the next-to-transmit buffer is relayed to the appropriate transmission channel of the receive-and-transmit site and transmitted. The timing window is necessary to allow for differences in RF propagation times and in IP WAN transfer times. The timing window allows asynchronous delivery of the transfer signal packets.

In a further embodiment of the invention, there may be some hysteresis in the voting, i.e. a previously selected receiving-only site is automatically used for the following data packet unless a data packet with significantly better bit error rate arrives. This hysteresis in the voting allows for some amount of continuity in remote site selection.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A distributed voter system for selecting at least one of several signals for transmission, comprising:
    a plurality of remote receive-only site systems each remote receive-only site system comprising:
        a first receiver configured for receiving a signal transmitted from a communication device,
        a first processor configured for determining a quality measure of said received signal, and for producing a transfer signal comprising said received signal and said quality measure;
    a plurality of network connections connecting each of said plurality of remote receive-only site systems to a common communications network;
    a receive-and-transmit site system communicatively coupled to said plurality of remote receive-only site systems via said plurality of network connections established absent of intermediary voting equipment, said receive-and-transmit site system comprising
        a second receiver configured for asynchronously receiving said transfer signals from said plurality of remote receive-only site systems,
        a second processor configured for
            storing a first transfer signal having a first quality measure as a selected transfer signal in a storage device, and,
            if a subsequently-received transfer signal has a quality measure better than said first quality measure, then replacing said first transfer signal with said subsequently-received transfer signal as said selected transfer signal and
        at least one transmitter configured for transmitting a broadcast signal comprising substantially said received signal of said selected transfer signal.

2. The system of claim 1, wherein said transfer signal is comprised of at least one digital packet.

3. The system of claim 2, wherein said digital packet conforms to a User Datagram Protocol (UDP) format.

4. The system of claim 1, wherein
    said quality measure comprises an estimate of a bit rate error of said received signal, and
    said second processor is further configured for selecting said transfer signal having a smallest of a plurality of estimates of bit rate error.

5. The system of claim 4, wherein said estimate of a bit rate error is obtained using data unit synchronization bits.

6. The system of claim 1, wherein said common communications network is a Local Area Network.

7. The system of claim 6, wherein said local area network is a high speed, asynchronous network.

8. The system of claim 1, wherein said second processor selects said selected transfer signal within a predetermined time window.

9. A distributed voter method for selecting at least one of several signals for transmission, comprising the steps of:
    a) receiving an input signal at a plurality of remote receive-only site systems;
    b) evaluating, at each of said plurality of remote receive-only site systems, a quality measure of said input signal;
    c) generating a transfer signal, at each of said plurality of remote receive-only site systems, by packaging said input signal and said quality measure as at least one data packet;
    d) transmitting, from each of said plurality of remote receive-only site systems, said transfer signal to a transmit-and-receive site system using a plurality of network connections of a common communications network that are absent of intermediary voting equipment;
    e) receiving asynchronously a first transfer signal and at least one subsequent transfer signal at said transmit-and-receive site system;
    f) recording said first transfer signal having a first quality measure as a selected transfer signal, and, if said subsequent transfer signal has a quality measure better than said first quality measure, then replacing said first transfer signal with said subsequent transfer signal as said selected transfer signal; and,
    g) transmitting a broadcast signal from said transmit-and-receive site system, said broadcast signal comprising substantially said input signal of said selected transfer signal.

10. The method of claim 9, wherein said data packet is a digital packet.

11. The method of claim 10, wherein said generating step c) further includes the step of conforming said digital packet to a User Datagram Protocol (UDP) format.

12. The method of claim 9, wherein
said evaluating step b) further includes calculating an estimate of a bit rate error of said input signal, and
said transmit-and-receive site system is further configured for selecting said transfer signal having a smallest of a plurality of estimates of bit rate error.

13. The method of claim 12, wherein said estimate of said bit rate error is calculated using a data unit's synchronization bits.

14. The method of claim 9, wherein said common communications network includes a Local Area Network.

15. The method of claim 14, wherein said Local Area Network includes a high speed, asynchronous network.

16. The method of claim 9, wherein said recording step f) is performed until expiration of a predetermined time window.

17. A distributed voter system for selecting at least one of several signals for transmission, comprising:
   a plurality of remote receive-only site systems, each remote receive-only site system is configured for receiving an input signal, evaluating a quality measure of said received input signal, and producing a transfer signal comprising said input signal and said quality measure;
   a network for asynchronously transferring said transfer signals from said plurality of remote receive-only site systems to a transmit-and-receive site system using a plurality of network connections absent of intermediary voting equipment; and,
   said transmit-and-receive site system configured for asynchronously receiving said transfer signals, and
   selecting one of said transfer signals received by said transmit-and-receive site system based on said quality measure, by recording a first transfer signal having a first quality measure and, if a subsequently-received transfer signal has a quality measure better than said first quality measure, replacing said first transfer signal with said subsequently-received transfer signal as said selected transfer signal, and
   transmitting a broadcast signal comprising substantially said input signal of said selected transfer signal.

18. The system of claim 17, wherein said transfer signal further comprises a digital packet.

19. The system of claim 17, wherein said digital packet conforms to a User Datagram Protocol (UDP) format.

20. The system of claim 17, wherein
said quality measure comprises an estimate of a bit rate error of said input signal, and
said transmit-and-receive site system is further configured for selecting said transfer signal having a smallest of a plurality of estimates of bit rate error.

* * * * *